(12) United States Patent
Zhu et al.

(10) Patent No.: US 6,212,477 B1
(45) Date of Patent: Apr. 3, 2001

(54) CONVERTED-WAVE ANALYSIS SYSTEM AND METHOD

(75) Inventors: Xianhuai Zhu; Suat Altan, both of Sugar Land; Matthew A. Brzostowski, Houston; Weizhug Wang, Katy, all of TX (US)

(73) Assignee: PGS Tensor, Inc., Houston, TX (US)

( * ) Notice: Subject to any disclaimer, the term of this patent is extended or adjusted under 35 U.S.C. 154(b) by 0 days.

(21) Appl. No.: 09/309,179

(22) Filed: May 10, 1999

(51) Int. Cl.$^7$ .............................. G01V 1/00; G01V 1/28; G06F 19/00
(52) U.S. Cl. ............................ 702/14; 367/53; 367/38; 702/11; 702/6
(58) Field of Search .................... 367/38, 73, 51, 367/52, 53, 58, 50; 702/14, 6, 10, 11; 73/152.02; 166/250.01; 191/195

(56) References Cited

U.S. PATENT DOCUMENTS

| | | | |
|---|---|---|---|
| 4,797,861 | * | 1/1989 | Beasley .................................. 367/50 |
| 4,839,869 | * | 6/1989 | Corcoran ............................... 367/53 |
| 5,097,452 | | 3/1992 | Beasley . |
| 5,500,832 | * | 3/1996 | Berryhill ............................... 367/51 |
| 5,596,547 | | 1/1997 | Bancroft et al. . |

OTHER PUBLICATIONS

Zhong, Benshan, et al., "A new strategy for CCP stacking," Geophysics, vol. 60, No. 2 (Mar.–Apr. 1995); pp. 517–521.
Leon Thompson, "Converted–wave reflection seismology over anisotropic, inhomogeneous media," 68$^{th}$ Annual Internat Mtg., Soc., Expl. Geophys., 1998, 2048–2051.
M.P. Harrison and R.R. Stewart, "Poststack migration of P–SV seismic data," Geophysics, 1993, 58, No. 8, 1127–1135.
M.P. Harrison, "Processing of P–S Surface Seismic Data: Anisotropy Analysis, Dip Move–out, and Migration," 1992, Ph.D. Thesis, University of Calgary.
G. Tessmer and A. Behle, "Common reflection point data–stacking technique for converted waves," Geophysical Prospecting, 1988, 36, 661–688.
H.F. Gerlad et al., "Dip Movement and Pre–stack Imaging," 18$^{th}$ Annual Offshore Technology Conference, Abstracts, 75–84.
P.J. Fowler, "A Comparative Overview of Pre–stack Time Migration Method," 67$^{th}$ Annual International Meeting of the SEG, 1999, Excarded Abstracts, 1571–1574.
J.C. Bancroft and H.D. Geiger, "Equivalent offset CRP gathers," 64$^{th}$ Annual Internat Mtg., Soc. Expl. Geophys., 1994, 672–675.
M.T. Taner and F. Koehler, "Velocity spectra–digital computer derivation and applications of velocity functions," Geophysics, 1969, 34, No. 6, 859–881.
P.S. Schultz and J.F. Claerbout, "Velocity estimation and downward–continuation by wavefront synthesis," Geophysics, 1978, 43, No. 4, 691–714.
J.R. Berryhill, "Wave–equation datuming before stack," Geophysics, 1984, 49, 2064–2066.

* cited by examiner

*Primary Examiner*—Christine Oda
*Assistant Examiner*—Anthony Jolly
(74) *Attorney, Agent, or Firm*—Arnold & Associates

(57) ABSTRACT

Method and systems are provided for processing c-wave data resulting in less sensitivity to errors in p-wave velocity analysis. Therefore, according to one aspect of the invention, a process is provided for processing c-wave data, the process comprising: providing zero-offset gather without a hyperbolic movement correction; performing migration on the zero-offset gather; performing velocity analysis on the migrated zero-offset gather; and performing NMO on the migrated data using the velocity from the velocity analysis.

13 Claims, 4 Drawing Sheets

CONVERTED-WAVE ANALYSIS SYSTEM AND METHOD

BACKGROUND OF THE INVENTION

This invention relates to the art of seismic signal processing. More specifically, the invention relates to migration and velocity analysis of converted wave data.

Current methodologies for velocity analysis or imaging p-s seismic data (a.k.a. "converted wave" data) require knowledge of p-wave velocity to get a converted s-wave velocity. However, one of the reasons for using converted waves is that s-waves can be detected in some areas where there is no p-wave data. Thus, accurate knowledge of the p-wave velocity cannot be derived from the data. Therefore, an estimate of the p-wave going down and the s-wave coming up is made to calculate a Vp/Vs ratio. Events on a gather are viewed, and a velocity is picked for the "move-out" that would best fit the actual event in the data with a curve.

In a specific example, seen in FIG. 1, a p-wave section is seen in which a gas cloud 10 is present. No p-wave velocity picking can be done in that area. FIG. 2 is a p-s image, showing that the s-wave data travels through the gas cloud. The velocity picked is, effectively, a weighed average of the down-going and up-going fields, but it is not known whether the ratio of the s-wave velocity Vs to the p-wave velocity Vp is 40/60, 50/50, or something else.

In some cases, where there is p-wave data available, a Vs/Vp ratio is estimated by determining Vp from the p-p data (e.g. from a hydrophone or vertical geophone in a multicomponent system). In the alternative, Vp data from nearby well logs might be used. When p-p data is used, a time equation that is dependent only on Vp is compared to events in the data. Vp is varied, and the Vp where there is maximal energy is chosen as the correct Vp. Converted wave data is then viewed (for example, from a horizontal component of a multicomponent detector), and a different equation is used. That equation is dependent upon both Vp and Vs. Vp is presumed to be what was found from the vertical geophone or hydrophone. Then, Vs is varied, and the Vs where there is maximum energy is chosen as Vs. If Vp is wrong, Vs will be wrong. NMO, DMO, and migration are then performed. Since these processes are heavily dependent on having a correct Vp, errors can be great.

Thus, there is a need for a method and system of analyzing velocity of converted wave data in which the need for well-log data is reduced or eliminated and in which there is less dependence on accurate Vp analysis.

SUMMARY OF THE INVENTION

It is an object of the present invention to address the above needs. Therefore, according to one aspect of the invention, a process is provided for processing c-wave data, the process comprising: providing zero-offset gather, substantially uncorrected by normal move-out; performing migration on the zero-offset gather; performing velocity analysis on the migrated zero-offset gather; and performing NMO on the migrated data using the velocity from the velocity analysis.

According to another aspect of the invention, a system is provided for processing converted wave seismic data comprising: means for providing zero-offset gather substantially uncorrected by normal move-out; means for performing velocity analysis on the migrated zero-offset gather; and means for performing NMO on the migrated data using the velocity from the velocity analysis.

According to another aspect of the invention, a system is provided for processing converted wave seismic data comprising: a migration module positioned and arranged to receive a zero-offset gather and output a migrated set of data substantially independent of velocity analysis; a velocity analysis module positioned and arranged to receive migrated data from said migration module and perform velocity analysis on the migrated data; and a NMO module positioned and arranged to receive a velocity model from said velocity module and the migrated data from said migration module and perform NMO on the migrated data using the velocity from the velocity analysis.

DESCRIPTION OF THE DRAWINGS

For a more complete understanding of the present invention and for further advantages thereof, reference is made to the following Detailed Description of Example Embodiments of the Invention, taken in conjunction with the accompanying drawings, in which.

It is to be noted, however, that the appended drawings illustrate only typical embodiments of this invention and are therefore not to be considered limiting of its scope, for the invention will admit to other equally effective embodiments.

DETAILED DESCRIPTION OF EXAMPLE EMBODIMENTS OF THE INVENTION

Figure 1:
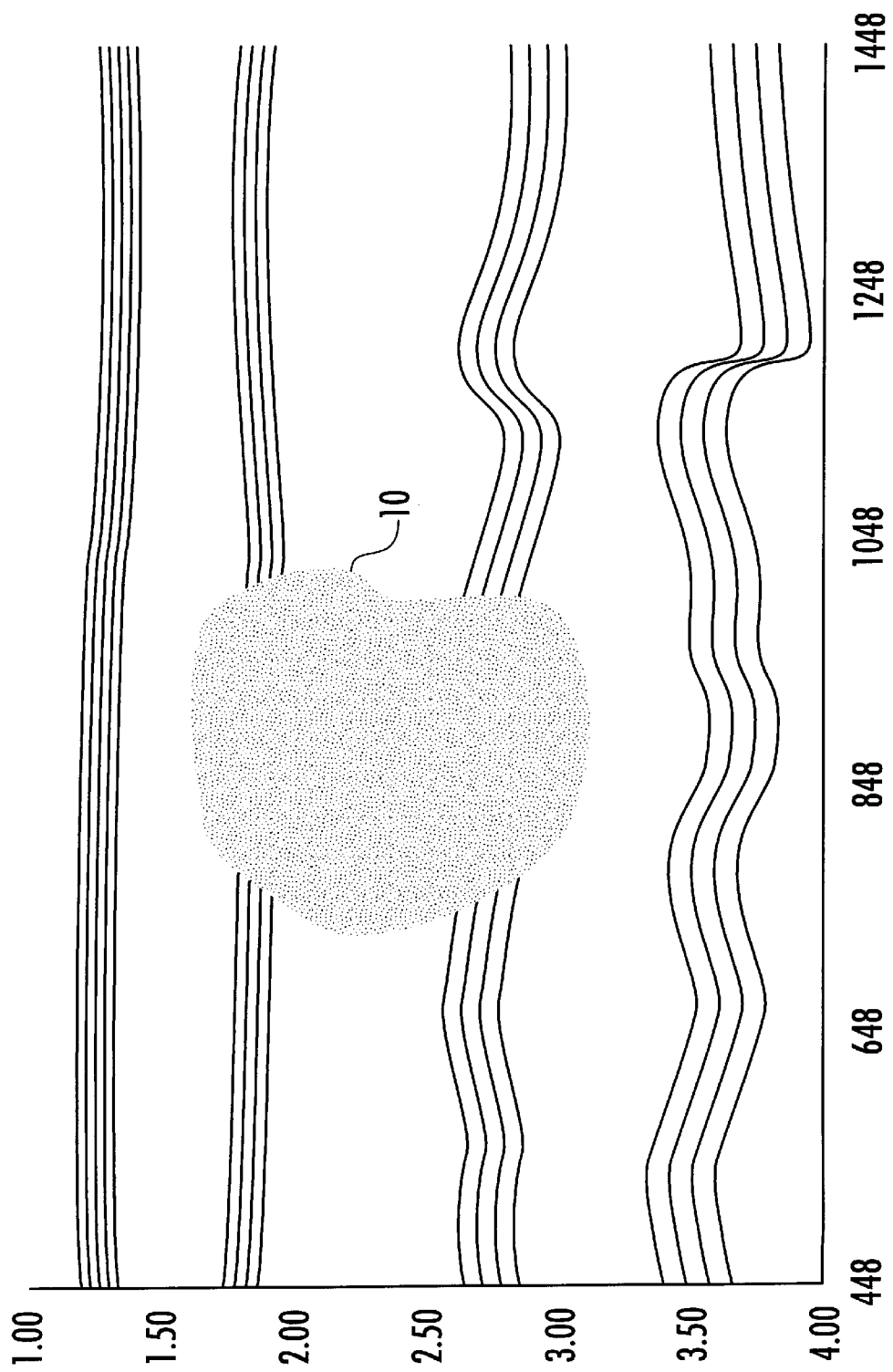
FIG. 1 is an illustration of p-p wave data.
Figure 2:
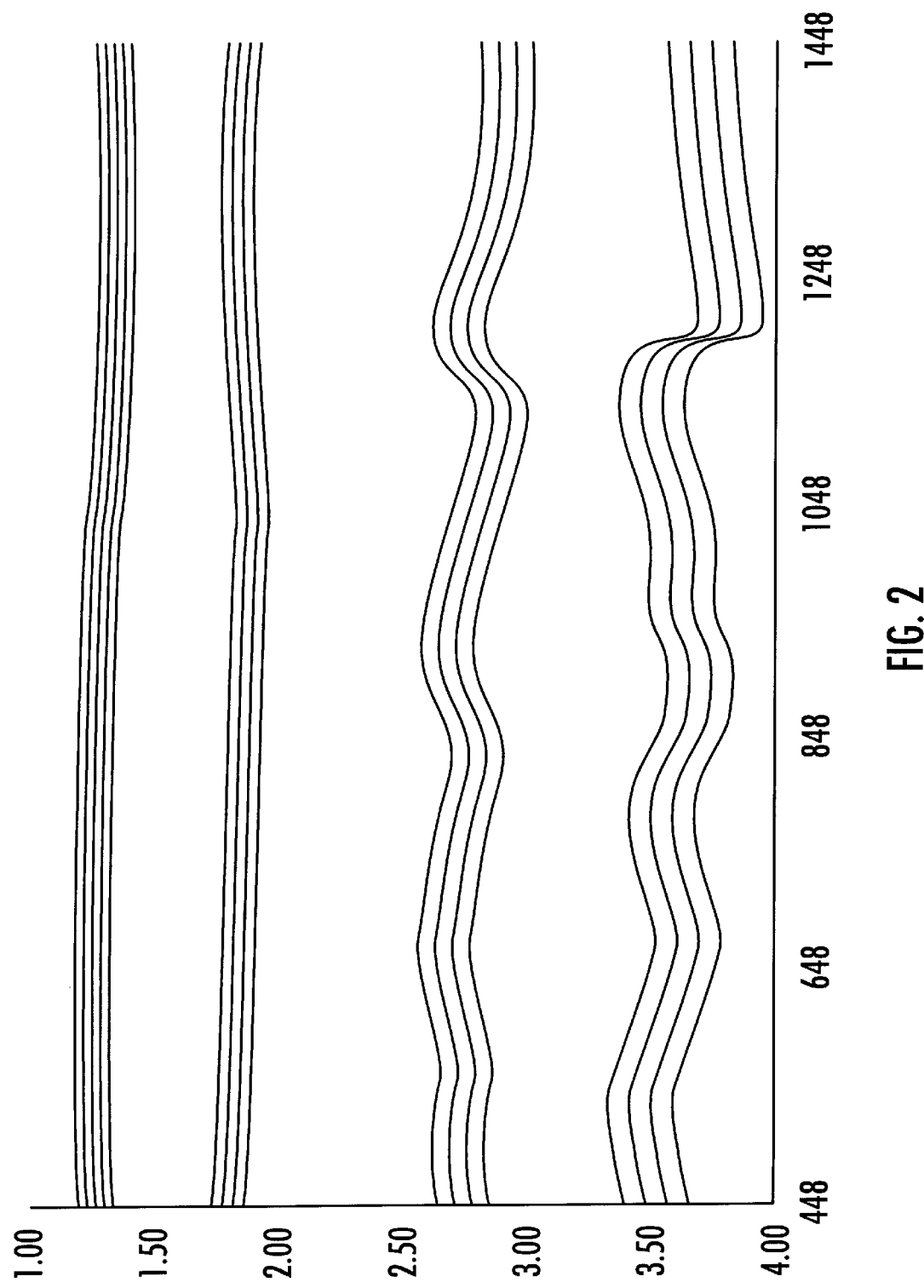
FIG. 2 is an illustration of p-s wave data.
Figure 3:
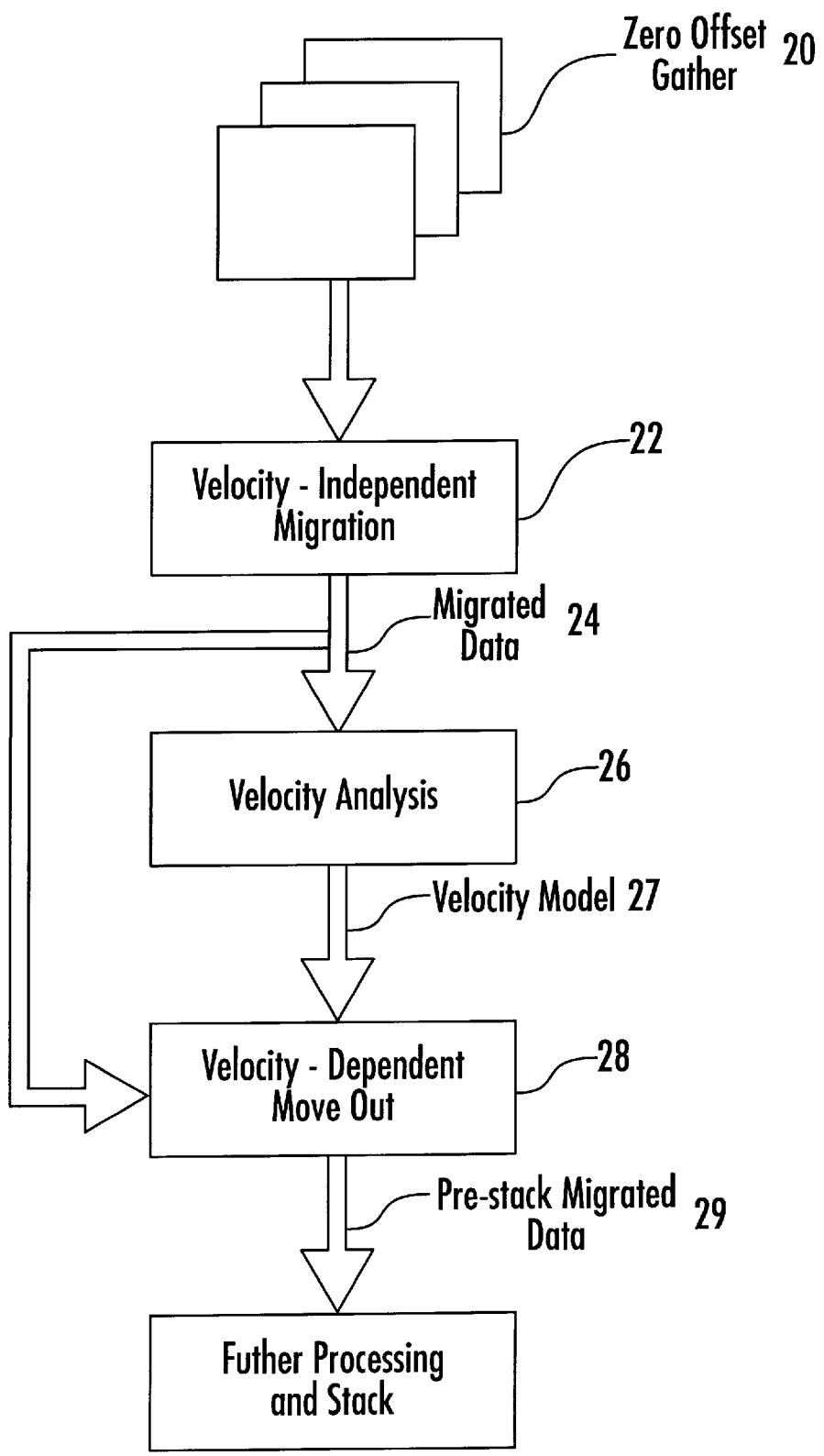
FIG. 3 is a flow chart of a process embodiment of the present invention.

Referring now to FIG. 3, a flow chart of steps used according to one non-limiting example embodiment of the invention is given in which a converted-wave zero-offset gather 20 is provided. There is little or no NMO in the data (a.k.a. "normal move-out," which refers to velocity-dependent modification of the data on the time axis). Next, a velocity-independent migration step 22 is performed on the zero-offset gather 20, resulting in migrated data 24. A velocity analysis step 26 is performed on the migrated data 24, and a velocity-dependent move-out step 28 is performed on the migrated data 24, using the velocity model 27 resulting from the velocity analysis step 26. The resulting pre-stack, migrated data 29 is then available for further processing, including stacking and other steps.

The zero-offset gather 20 is achieved, according to various embodiments of the invention, by methods that will occur to those of skill in the art. In one example embodiment, the zero-offset gather is achieved according to a converted-wave method described by (Harrison, M. P., 1992 "Processing of P-S Surface Seismic Data: Anisotropy Analysis, Dip Move-out, and Migration," Ph.D. Thesis, Univ. of Calgary, available from UMI Dissertation Services, (800) 521-0600), incorporated herein by reference.

Then, after the Harrison method, inverse NMO is performed, using an estimation of the converted-wave velocity. Various methods of estimation of the converted wave velocity will occur to those of skill in the art. According to one embodiment of the invention, the estimate of the converted wave velocity is found by the method described in Thompson, Leon, 1998 "Converted-wave reflection seismology over anisotropic, inhomogeneous media ($68^{th}$ Ann. Internat. Mtg., Soc., Expl. Geophys. 2048–2051)," incorporated herein by reference. Other methods believed to be acceptable include Harrison, M. P., and Stewart, R. R., 1993, "Poststack migration of P-SV seismic data (Geophysics, 58, No. 8, 1127–1135)". The result is a zero-offset gather that is substantially uncorrected by normal move-out. In an alternative embodiment, a Vs/Vp ratio estimate from well logs is used, while, in other embodiments, a simple guess of the Vs/Vp ratio is used (e.g. 2). Again, the result is a zero-offset gather without hyperbolic move-out correction. Other methods for providing for zero-offset gathers substantially uncorrected by normal move-out, which are believed to be acceptable include Tessmer, G., and Behle A., 1988, "Common reflection point data-stacking technique for converted waves (Geophysical Prospecting, 36, 661–688)".

The velocity-independent migration step 22 is applied in various embodiments by methods that will occur to those of skill in the art. According to one specific embodiment, radial migration is performed as described in Gerlad, H. F., et al., "Dip Movement and Pre-stack Imaging," 18$^{th}$ Annual Offshore Technology Conference, Abstracts, 75–84, incorporated herein by reference, and, Fowler, P. J., 1999, "A Comparative Overview of Pre-stack Time Migration Method," 67$^{th}$ Annual International Meeting of the SEG, Excarded Abstracts, 1571–1574, incorporated herein by reference. Other methods of migration which are substantially velocity-independent will occur to those of skill in the art. Examples believed to be acceptable include Bancroft, J. C., and Geiger, H. D., 1994, "Equivalent offset CRP gathers (64$^{th}$ Ann. Internt. Mtg., Soc, Expl. Geophys., 672–675)".

The velocity analysis step 26 is performed on the migrated data 24 by other various methods that will occur to those of skill in the art: According to one specific embodiment, the velocity analysis comprises maximum semblance of hyperbolic move-out. The resulting velocity model will be dependent upon both the p-wave and the s-wave velocity. Other examples believed to be acceptable include Taner, M. T., and Koehler, F., 1969, "Velocity spectra-digital computer derivation and applications of velocity functions (Geophysics, 34, No. 6, 859–881).

The velocity-dependent move-out step 28 is also performed by various methods known to those of skill in the art, one example of which is the normal move-out. Various methods of NMO are well known to those of ordinary skill in the art. Other methods of performing velocity-dependent move-out believed to be acceptable include Schultz, P. S., and Claerbout, J. F., 1978, "Velocity estimation and downward-continuation by wavefront synthesis (Geophysics, 43, No. 4, 691–714)", and Berryhill, J. R., 1984, "Wave-equation datuming before stack (Geophysics, 49, 2064–2066)".

Figure 4:
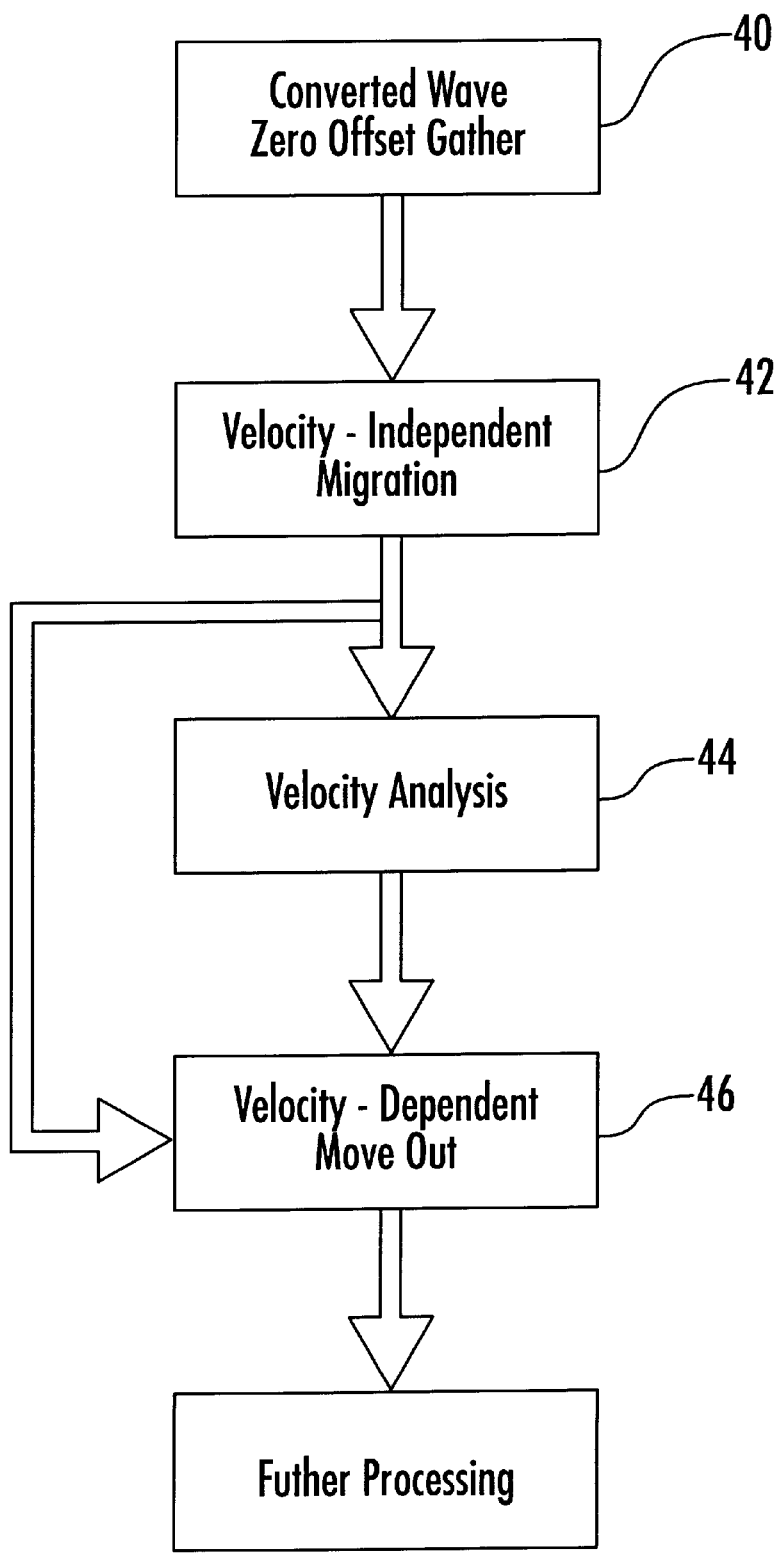
FIG. 4 is a block diagram of an embodiment of the invention.

Referring now to FIG. 4 a system used according to another aspect of the invention is seen in a non-limiting example embodiment, in which a means 40 for providing a zero-offset gather 20 is provided. Little or no NMO or other velocity-dependent modification of the data in gather 20 on the time axis exists, either due to lack of NMO performance or due to inverse NMO after DMO. According to one specific embodiment, means 40 comprises a software module which performs NMO, using an estimate of velocity, chosen by any method or means know to those of skill in the art, performs DMO on the resulting data after move out, and performs an inverse NMO, using the same velocity, whereby a zero offset gather is provided as the output. Next, a means 42 for performing a velocity-independent migration 22 is provided, which performs the migration 22 on the zero-offset gather 20, resulting in migrated data 24. According to one specific embodiment, means 42 comprises a migration software module positioned and arranged to receive the zero-offset gather 40 and output a migrated set of data 24 substantially independent of velocity analysis.

A means 44 for performing velocity analysis step 26 is also provided, which performs the velocity analysis 26 on the migrated data 24, and a means 46 for velocity-dependent move-out step 28 performs on the migrated data 24, using the velocity model 27 resulting from the velocity analysis step 26. The resulting pre-stack, migrated data 29 is then available for further processing, including stacking and other steps. According to one specific embodiment, means 44 comprises a velocity analysis software module positioned and arranged to receive migrated data 24 from the means 42 and perform velocity analysis on the migrated data.

The various means 40–46 comprise computer program modules, written in Cube Manager (a commercially available seismic processing system, known to those of skill in the art) and run on a Unix operating system on massively parallel computers, such as, for example, a SP2 made by IBM. Other means 40–46 will occur to those of skill in the art, and will, in alternative embodiments, include software alone, hardware, alone, and combinations of hardware and software.

What is claimed is:

1. A method for processing converted wave seismic data comprising:

providing a converted-wave zero-offset gather substantially uncorrected by normal move-out;

performing migration on the zero-offset gather;

performing velocity analysis on the migrated zero-offset gather; and performing NMO on the migrated data using the velocity from the velocity analysis.

2. A method as in claim 1 wherein said providing comprises:

performing normal move out on the converted wave data using a normal move out velocity, whereby moved out data results;

performing dip move out on the moved out data, whereby dip moved out data results; and performing an inverse normal move out on the dip moved out data, using the move out velocity, whereby a zero offset gather is provided as the output.

3. A method as in claim 1, wherein said providing a converted-wave zero-offset gather comprises providing a common conversion point binned gather.

4. A method as in claim 1, wherein said performing velocity analysis comprises performing velocity analysis substantially independent of p-wave velocity.

5. A method as in claim 1, wherein said performing NMO comprises second order NMO.

6. A method as in claim 1, wherein said performing NMO comprises NMO having orders higher than second order NMO.

7. A system for processing converted wave seismic data comprising:

means for providing a zero-offset gather substantially uncorrected by normal move-out;

means for performing migration on the zero-offset gather;

means for performing velocity analysis on the migrated zero-offset gather; and means for performing NMO on the migrated data using the velocity from the velocity analysis.

8. A method as in claim 7 wherein said means for providing a zero-offset gather comprises:

means for performing normal move out on the converted wave data using a normal move out velocity, whereby moved out data results;

means for performing dip move out on the moved out data, whereby dip moved out data results; and means for performing an inverse normal move out on the dip moved out data, using the move out velocity, whereby a zero offset gather is provided as the output.

9. A method as in claim 7, wherein said mean for providing a converted-wave zero-offset gather comprises providing a common conversion point binned gather.

10. A method as in claim 7, wherein said mean for performing velocity analysis comprises performing velocity analysis substantially independent of p-wave velocity.

11. A method as in claim 7, wherein said mean for performing NMO comprises second order NMO.

12. A method as in claim 7, wherein said mean for performing NMO comprises NMO having orders higher than second order NMO.

13. A system for processing converted wave seismic data comprising:

a migration module positioned and arranged to receive a zero-offset gather and output a migrated set of data substantially independent of velocity analysis;

a velocity analysis module positioned and arranged to receive migrated data from said migration module and perform velocity analysis on the migrated data; and a NMO module positioned and arranged to receive a velocity model from said velocity module and the migrated data from said migration module and perform NMO on the migrated data using the velocity from the velocity analysis.

* * * * *